(12) United States Patent
    Schechtel et al.

(10) Patent No.: US 8,031,461 B2
(45) Date of Patent: Oct. 4, 2011

(54) HINGED DEVICE WITH ROTATIONAL HINGE ACTUATION

(75) Inventors: Kevin J. Schechtel, Algonquin, IL (US); Roger W. Harmon, Crystal Lake, IL (US); Nicholas Woodley, London (GB)

(73) Assignee: Motorola Mobility, Inc., Libertyville, IL (US)

( * ) Notice: Subject to any disclaimer, the term of this patent is extended or adjusted under 35 U.S.C. 154(b) by 978 days.

(21) Appl. No.: 11/687,877

(22) Filed: Mar. 19, 2007

(65) Prior Publication Data
    US 2008/0232071 A1     Sep. 25, 2008

(51) Int. Cl.
    *H05K 5/00*      (2006.01)
(52) U.S. Cl. ......... 361/679.01; 361/679.07; 361/679.02; 361/679.05; 174/542; 174/559; 174/560
(58) Field of Classification Search .................. 361/814, 361/816, 818, 728, 749, 681, 679.01, 679.07, 361/679.05, 679.02, 679.06, 679.27, 679.3; 455/575.1, 575.3, 575.8, 90.3, 550.1; 379/429, 379/433, 457; 16/233, 235, 282, 302; 174/542, 174/559, 560, 535, 520
See application file for complete search history.

(56) References Cited

U.S. PATENT DOCUMENTS

| | | | |
|---|---|---|---|
| 6,151,486 A * | 11/2000 | Holshouser et al. | 455/575.3 |
| 6,366,440 B1 * | 4/2002 | Kung | 361/147 |
| 6,788,551 B2 | 9/2004 | Takagi | |
| 2003/0064758 A1 * | 4/2003 | Mizuta et al. | 455/566 |
| 2005/0107138 A1 * | 5/2005 | SanGiovanni | 455/575.1 |
| 2006/0046792 A1 * | 3/2006 | Hassemer et al. | 455/575.1 |
| 2006/0154706 A1 * | 7/2006 | Kim | 455/575.4 |

* cited by examiner

*Primary Examiner* — Hoa C Nguyen

(57) ABSTRACT

A device (100) having a first housing (101) and a second housing (102) may be selectively opened with a multi-axis coupling mechanism (500). The multi-axis coupling mechanism (500) works as an opening mechanism that is configured to cause the first housing (101) and the second housing (102) to rotate angularly about an opening axis (105) due to a preloaded tensioning device (401). The first housing (101) and second housing (102) are held in a closed position by retaining devices. The multi-axis coupling mechanism (500) is actuated when the first housing (101) is rotated about an actuation axis (106) that, in one embodiment, is substantially perpendicular to the opening axis (105). Opposing members may be employed to assist the multi-axis opening mechanism (500) during initial actuation.

22 Claims, 8 Drawing Sheets

HINGED DEVICE WITH ROTATIONAL HINGE ACTUATION

BACKGROUND

1. Technical Field

This invention relates generally to hinged portable devices, and more particularly to a hinged portable electronic device, wherein the hinge is capable of actuation by a rotational motion of a device housing.

2. Background Art

Portable electronic devices, such as mobile telephones, smart phones, personal digital assistants, and gaming devices are becoming ever more popular. By some estimates, there are nearly two billion mobile telephones in use around the world today. These electronic devices generally come in different styles, two of which include the "candy bar" and "hinged" configurations. A candy bar style device is generally rectangular in shape with both keypad and display visible and accessible at all times. A hinged style device generally includes a mechanical hinge between the two halves of the device, and is foldable. Consumers sometimes prefer a hinged device because, when closed, the device is generally smaller than its candy bar counterpart. Additionally, the keypad and display are protected when the hinged device is closed.

Users of hinged devices generally prefer to use a hinged device that is operable with one hand. In other words, they desire a hinged device where the hinge can be opened with a single hand. In the case of a mobile telephone, such an automatic opening mechanism allows a user to open the phone and answer a call while the other hand is occupied. The problem with this desire for automatic opening is that consumers also want feature packed devices that are easily carried in a pocket. Adding an automatic opening feature consumes valuable real estate within the device that is generally needed for other features, such as cameras, transceivers, displays, and other devices.

There is thus a need for an improved hinged device having a hinge that can be actuated with a single hand.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 2:
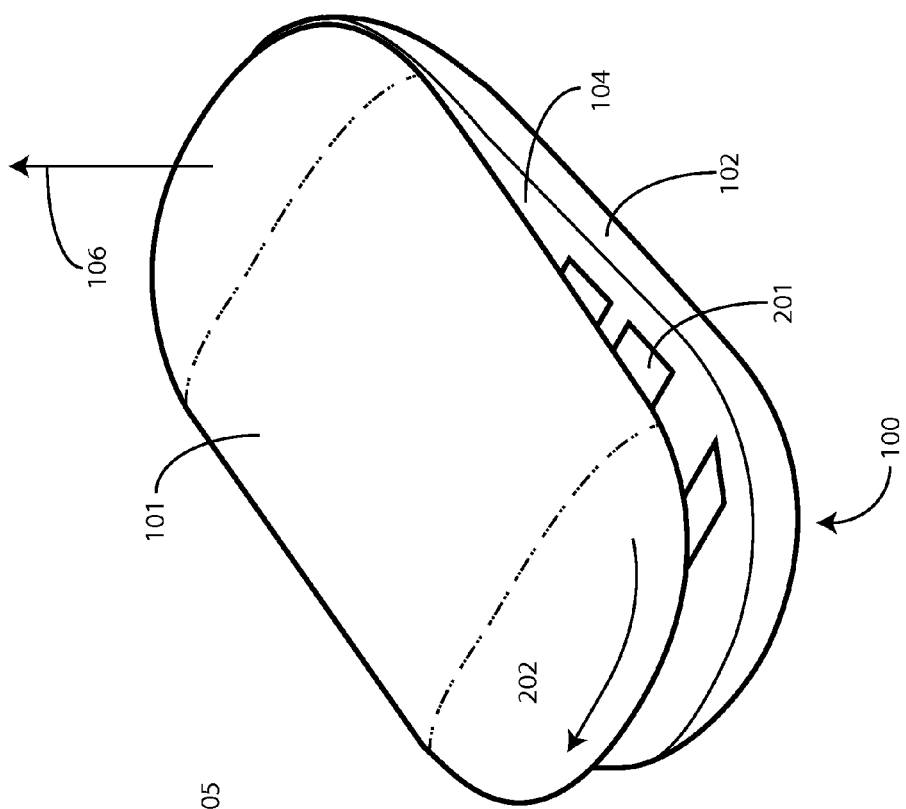
FIG. 2 illustrates a hinged device in accordance with embodiments of the invention when one portion of the housing has been rotated relative to the other portion so as to actuate the hinge.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms, such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A. It is further understood that while a mobile telephone is used for discussion purposes herein as an exemplary embodiment, the hinge mechanisms of the present invention may be used more generally in any application where it is desirable to provide a collapsible device as will become more fully apparent from the discussion below.

As will be shown and illustrated herein, embodiments of the invention include a hinged device, wherein a preloaded hinge is configured for actuation by a single hand. In one embodiment, the hinged device is held in a closed position by a retaining device. When a first portion of the device is rotated relative to the second portion of the device, the retaining device releases. This rotation of the portions, or housings, of the device in a first direction actuates the hinge, which is biased by a preloaded tensioning device. Upon actuation, the housing portions rotate about the hinge in a second direction, which is different from the actuation rotation direction.

Figure 1:
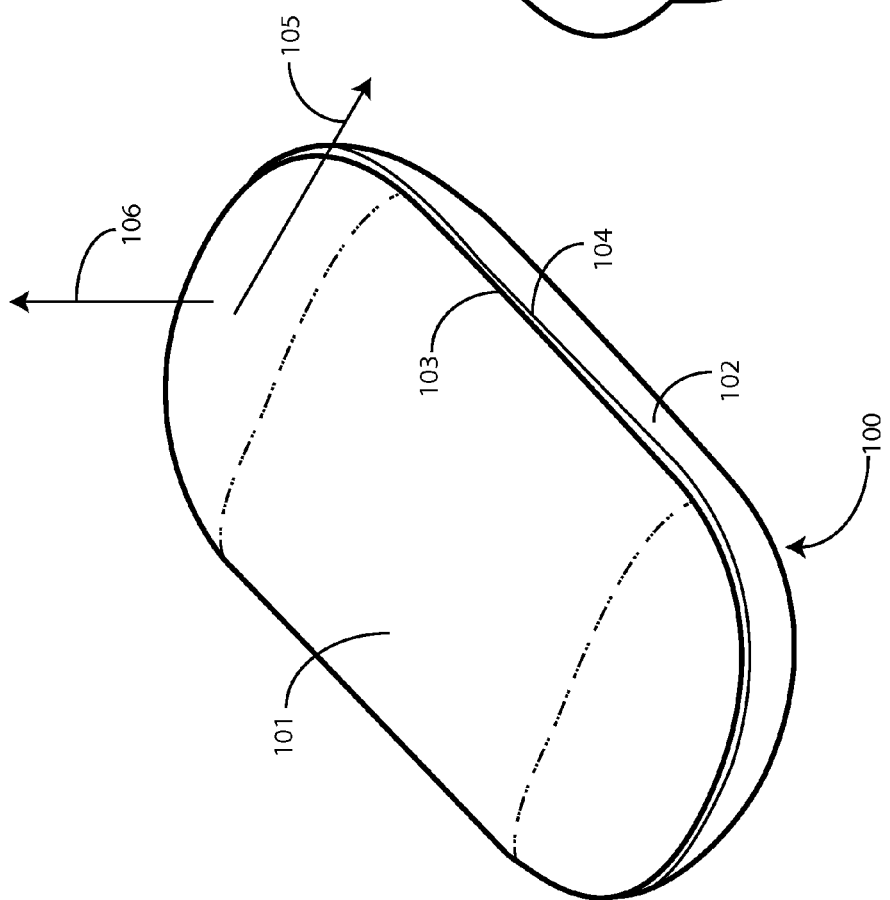
FIG. 1 illustrates a hinged device in accordance with embodiments of the invention in a closed position.

Turning now to FIG. 1, illustrated therein is one embodiment of an exemplary collapsible electronic device 100 in a closed position. In this exemplary embodiment, for ease of illustration, the electronic device 100 is a mobile telephone. The mobile telephone described herein is a representation of the type of device suitable for a multi-axis opening mechanism as set forth herein. It will be clear to those of ordinary skill in the art having the benefit of this disclosure, however, that the invention is not so limited. The multi-axis opening mechanism of the present invention may be applied to any type of hand-held or portable device including, but not limited to, telephones, cordless phones, paging devices, personal digital assistants, portable computers, pen-based or keyboard-based handheld devices, remote control units, portable media players such as an audio player (such as an MP3 player), and the like. Accordingly, any reference herein to a mobile telephone should also be considered to apply equally to other hand-held or portable electronic devices.

The device 100 is shown in the exemplary closed position wherein a first housing 101 is substantially adjacent to a second housing 102 in a planar arrangement (i.e. a substantially planar surface, the first housing mating surface 103, of the first housing 101 mates with a substantially planar surface, the second housing mating surface 104, of the second housing). In one embodiment, coupling members, or retaining devices, engage the first housing 101 and second housing 102 in the closed position by retaining the first housing 101 and second housing 102 together. As will be seen below, one exemplary retaining device is a magnetic coupling configured to exert an attracting force between the first housing 101 and the second housing 102 when in the closed position.

The first housing 101 is movably coupled to the second housing 102 by a multi-axis coupling mechanism, or multi-axis opening mechanism, which is not shown in FIG. 1 but is described in detail below with the discussion of FIGS. 4-8. The first housing 101 and second housing 102 are coupled to the multi-axis opening mechanism such that the second housing 102 rotates relative to the multi-axis opening mechanism about a first, opening axis 105. The first housing 101 also rotates relative to the second housing 102 about a second, actuation axis 106. Said slightly differently, the first housing 101 and second housing 102 are coupled to the multi-axis opening mechanism such that the first housing 101 rotates angularly relative to the second housing 102 about the first, opening axis 105, and the first housing 101 also rotates relative to the second housing 102 about a second, actuation axis 106. When rotating about the second, actuation axis 106, the first housing mating surface 103 moves substantially laterally across the second housing mating surface 104. In one embodiment, the opening axis 105 is substantially perpendicular with the actuation axis 106, although these two axes need not intersect.

When moving laterally, where retaining devices are employed, the lateral movement separates the retaining devices such that the biased hinge of the multi-axis opening mechanism can open the first housing 101 from the second housing 102. In one embodiment, to assist in the initial opening, opposing members are disposed in the first housing 101 and second housing 102. The opposing members are configured to exert a separating force between the first housing 101 and the second housing 102 when the first housing 101 rotates at least a predetermined amount, such as 5-10 degrees, about the actuation axis 106. In one embodiment, the opposing members are magnetic couplings configured to exert an opposing force.

Turning now to FIG. 2, illustrated therein is the device when the first housing 101 has been slightly rotated relative to the second housing 102 about the actuation axis 106. This rotation is in a first direction 202, where the first housing 101 and second housing 102 move substantially laterally relative to each other. As will be described in more detail below, this lateral movement actuates a biased hinge in the multi-axis opening mechanism by parting retaining members that hold the first housing 101 and the second housing 102 in the closed position.

When the first housing 101 is rotated slightly relative to the second housing 102, the second housing mating surface 104 becomes exposed, thereby exposing some of the features 201 on the second housing mating surface 104. Where the device 100 is a mobile telephone, these features may include a keypad, touch screen, or display. In one embodiment, a mechanical stop, described in more detail in the discussion below of FIGS. 6 and 8, limits the rotation of the first housing 101 about the actuation axis 106 to less than 12 degrees in either direction.

Figure 3:
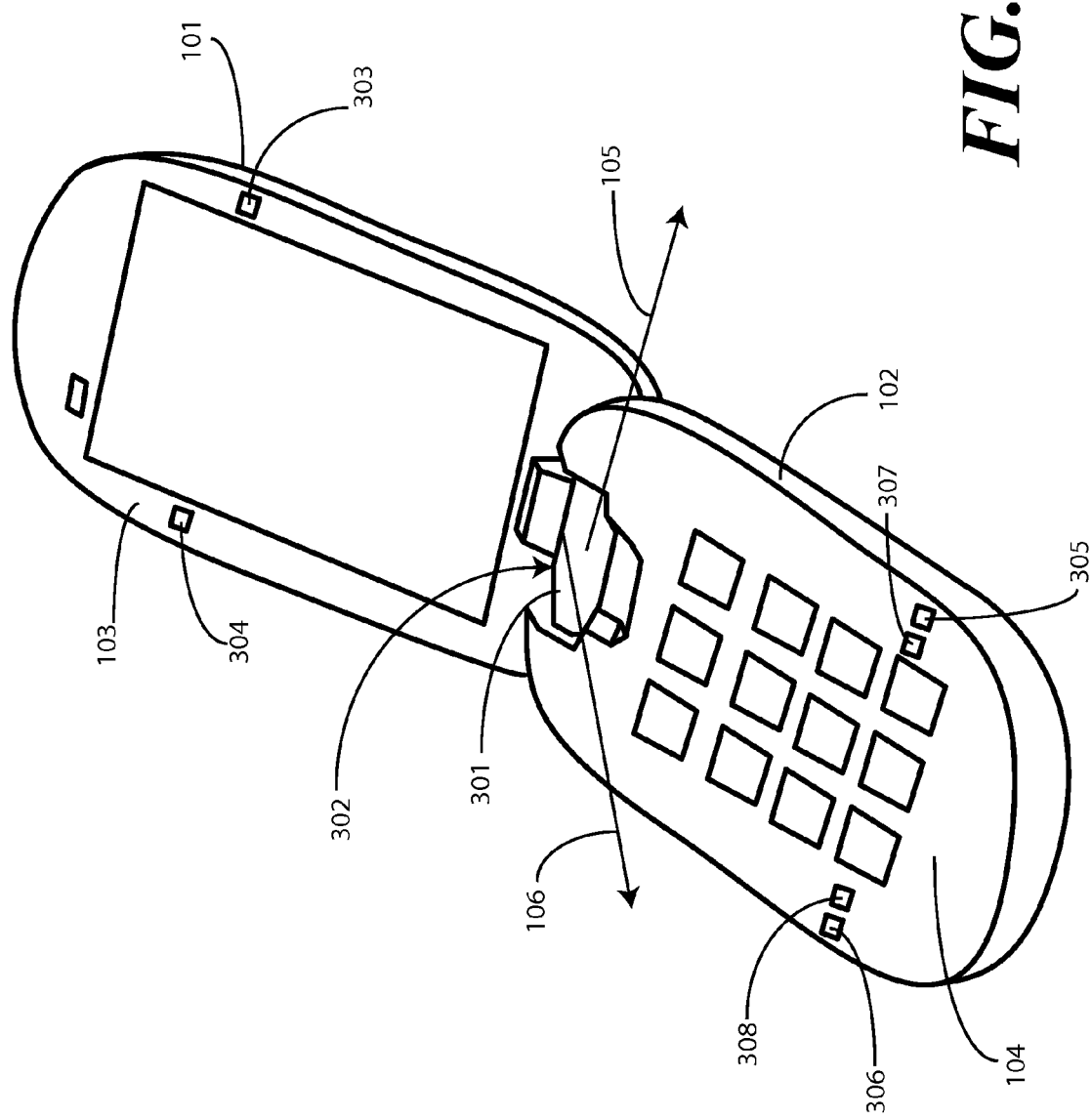
FIG. 3 illustrates a hinged device in accordance with embodiments of the invention in an open position.

Turning now to FIG. 3, illustrated therein is the device 100 where the first housing 101 has moved angularly relative to the second housing 102 about the opening axis 105 to an open position. This rotation, in one embodiment, is due to a biased hinge having a preloaded tensioning member that is operable about the opening axis 105. This preloaded tensioning device, which in one embodiment is a torsion spring, is disposed within a portion of the multi-axis opening mechanism known as the "knuckle" 301, which is mechanically attached to the second housing 102. The first housing 101 is joined to the knuckle 301 by a pivot assembly 302 that is operable about the about the actuation axis 106.

With the first housing 101 and second housing 102 being angularly rotated to the open position, various features disposed along the first housing mating surface 103 and the second housing mating surface are visible. Where the device 100 is a mobile telephone, these features may include a display, speaker, microphone, keypad, audio jacks, or other communication components.

In one embodiment, as noted above, the device 100 includes retaining devices to keep the first housing 101 and second housing 102 in the closed position until the first housing 101 is rotated about the actuation axis 106 relative to the second housing, thereby actuating the biased hinge of the multi-axis opening mechanism. In the open position of FIG. 3, one embodiment of such retaining members 303,304,305, 306 may be seen. The retaining members 303,304,305,306, which may be any of a magnetic coupling, hook and latch assembly, or other suitable device, are configured to oppose a preloaded tensioning device in the biased hinge of the multi-axis opening mechanism so as to retain the first housing 101 and the second housing 102 in the closed position. The rotary motion of the first housing 101 relative to the second housing 102 about the actuation axis separates the retaining members 303,304,305,306, thereby causing them to disengage. The disengagement allows the biased hinge to operate.

As noted above, in some embodiments it is desirable to provide mechanical assistance to the biased hinge to initiate the opening operation. As such, in one embodiment, the device 100 further includes an opening device 307,308. The opening device 307,308, which may be proximately disposed with the retaining device 305,306, is configured to bias the first housing 101 towards the angularly displaced open position upon a rotary motion of the first housing 101 relative to the second housing 102 about the actuation axis 106. In one embodiment, where magnetic couplings are used as retaining devices 303,304, the opening devices 307,308 comprise similarly polarized magnetic couplings that oppose the magnetic attraction of the retaining devices 303,304. Upon rotation about the actuation axis, one of retaining devices 303,304 aligns with one of opening devices 307,308 so as to apply an opening force between the first housing 101 and the second housing 102.

Figure 4:
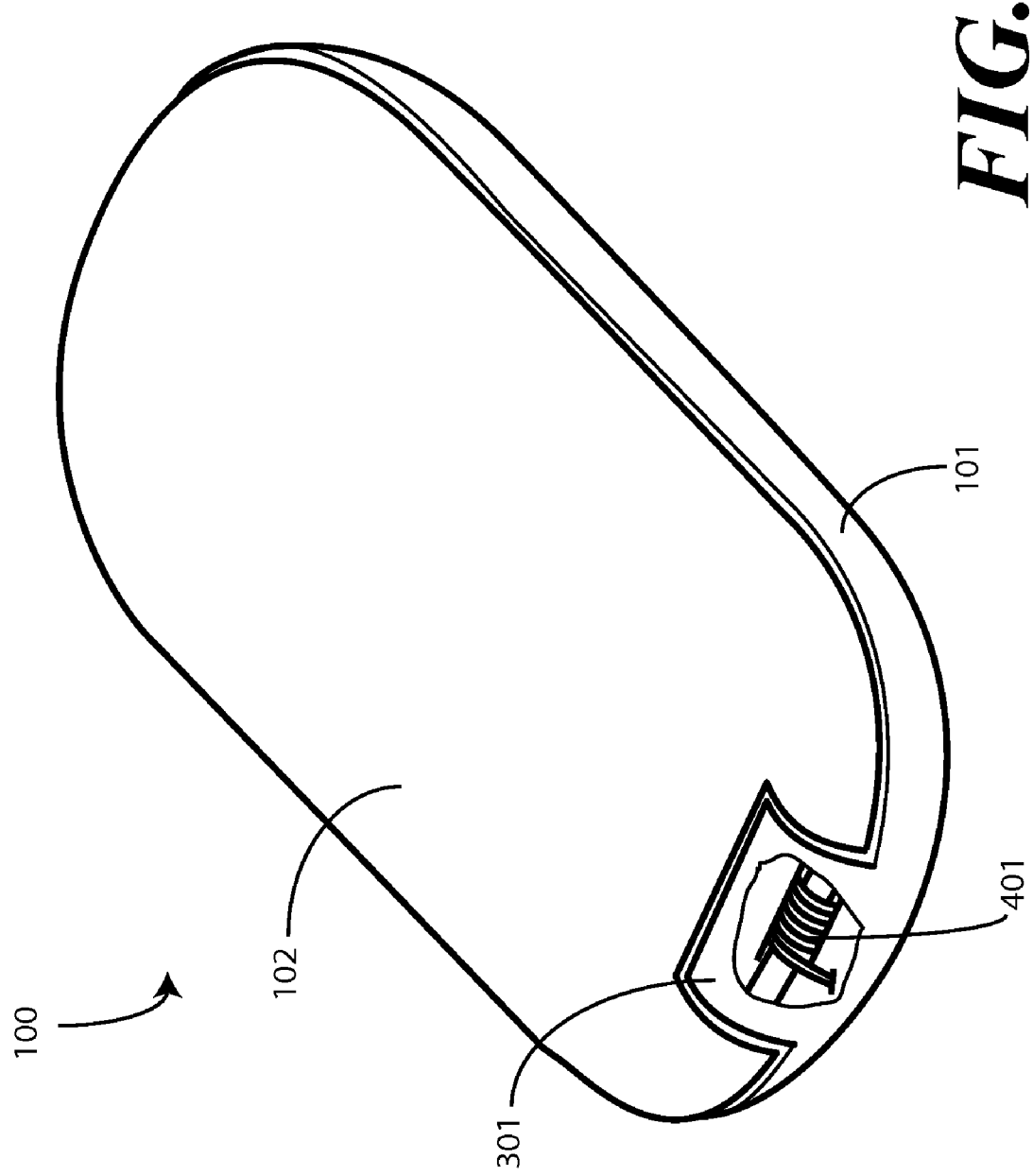
FIG. 4 illustrates a bottom perspective view of a hinged device in accordance with embodiments of the invention having a cut away section with a preloaded tensioning device shown.

Turning now to FIG. 4, illustrated therein is a bottom perspective view of the device 100 where the knuckle 301 may be more easily seen. In FIG. 4, the knuckle 301 has been cut away to expose the preloaded tensioning device 401, which in one embodiment comprises a torsion spring. The torsion spring may be incorporated into to the device 100 in various ways to exert a biasing force between the first housing 101 and the second housing 102. Although a torsion spring is one exemplary biasing member, other forms of the biasing member, such as a compression spring, may achieve the same result as will be understood by those skilled in the art having the benefit of this disclosure. The preloaded tensioning device 401 is configured to open the first housing 101 and the second housing 102 from the closed position to the angularly displaced open position upon actuation, as the biasing force exerted by the preloaded tensioning device 401 is towards the open position.

Figure 5:
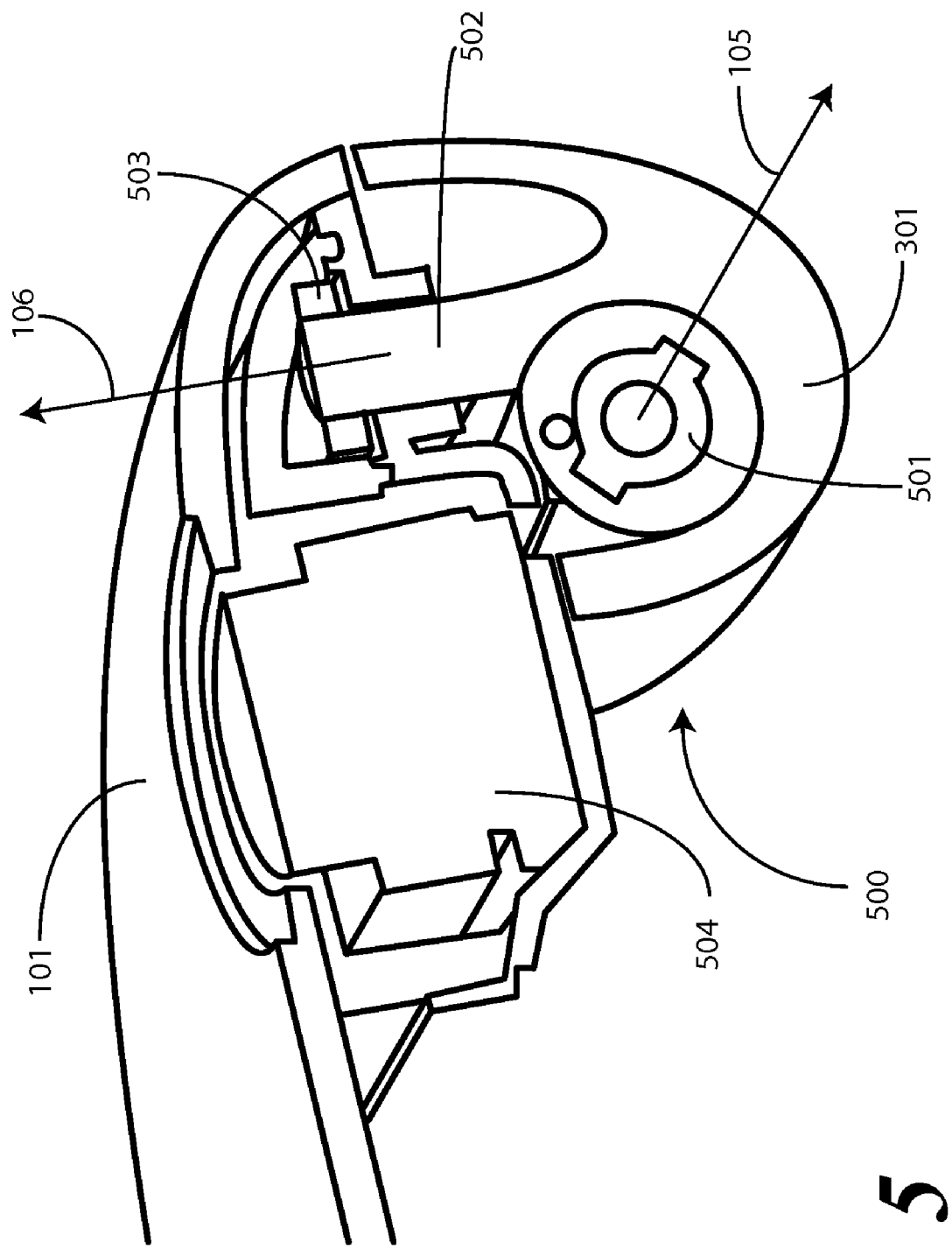
FIG. 5 illustrates a sectional view of a hinge configured for rotational actuation in accordance with one embodiment of the invention.

Turning now to FIG. 5, illustrated therein is a cut away view of one embodiment of a multi-axis coupling mechanism 500, which is suitable for service as a multi-axis opening mechanism for an electronic device (100). In the view of FIG. 5, the first housing 101 is shown coupled to the multi-axis coupling mechanism 500. The second housing (102), not shown in FIG. 5, couples to a rotary tumbler 501 disposed within the knuckle 301 of the multi-axis coupling mechanism 500. The rotary tumbler 501, which may be loaded with the preloaded tensioning device (401), permits both the multi-axis coupling mechanism 500 and the first housing to rotate angularly relative to the second housing (102) about the opening axis 105.

The first housing 101, in the embodiment of FIG. 5, couples to the knuckle 301 by way of a cylindrical post 502 emanating from the base of the knuckle 301. A mechanical arm 503 is affixed to the cylindrical post 502, thereby securely coupling the first housing 101 to the multi-axis coupling mechanism 500. The first housing 101 is configured such that rotation about the cylindrical post 502, and thus rotation about the actuation axis 106 to actuate the rotary member 501, is possible. The cylindrical post 502 thus serves as a "rotary member" about which the first housing 101 moves. The embodiment of FIG. 5 is sufficiently compact in design that other components, such as a digital camera 504, may be incorporated into the opening mechanism, thereby providing additional degrees of freedom to device designers. As noted above, in one embodiment, rotation about the actuation axis is limited to a range just sufficient to release any retaining members 303,304,305,306 that may be employed to retain the first housing 101 and the second housing (102) in the closed position.

Figure 6:
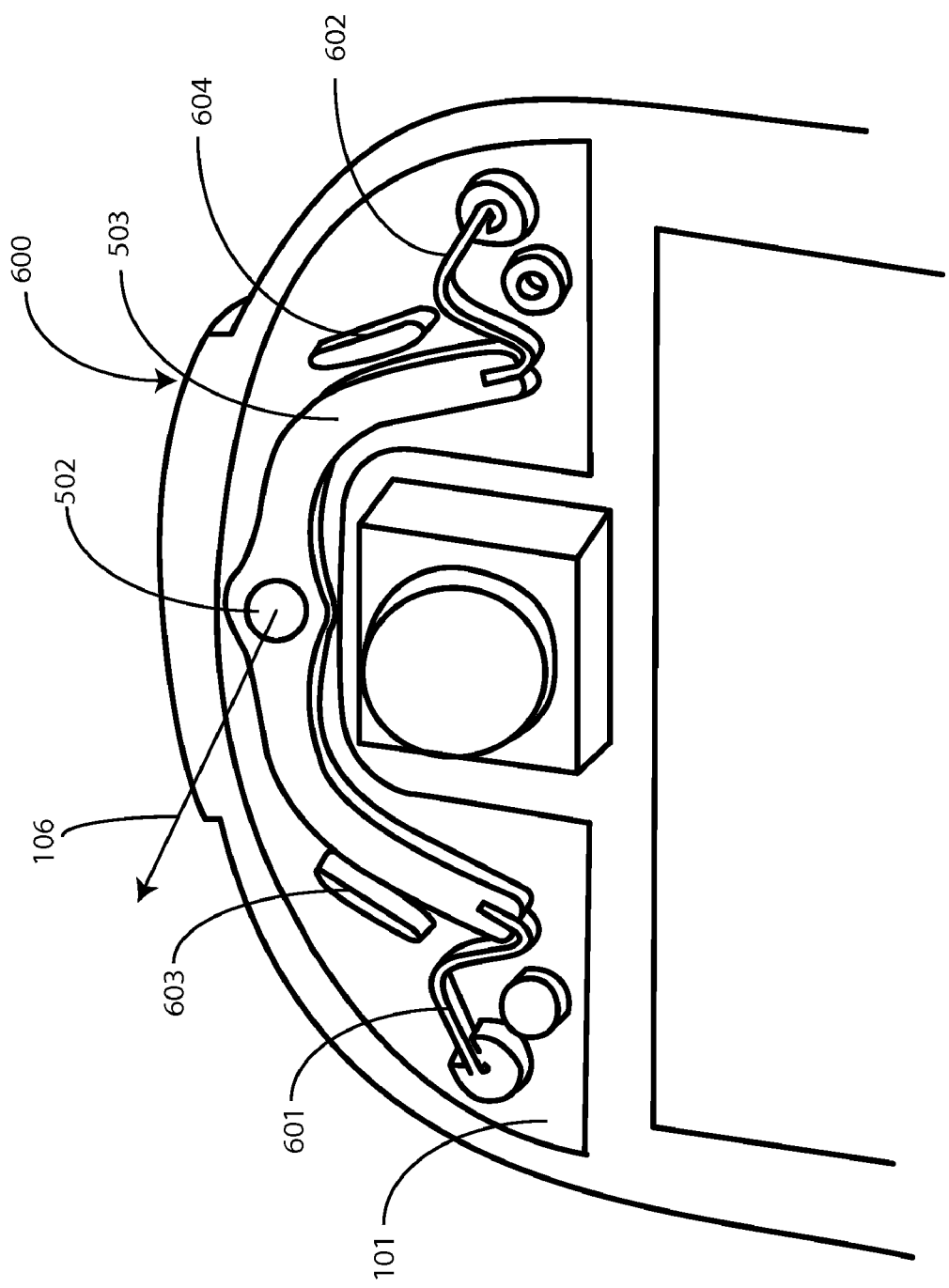
FIG. 6 illustrates a centering device in accordance with one embodiment of the invention.

Turning now to FIG. 6, illustrated therein is one embodiment of a centering device 600. The centering device 600 is configured to oppose rotary motion of the first housing 101 about the actuation axis, and may also be used to limit the amount of rotation the first housing 101 makes about the actuation axis 106 when the cylindrical post 502 is used to couple the first housing 101 to the multi-axis coupling mechanism (500).

In FIG. 6, several components from FIG. 5 can be seen, including the first housing 101, the cylindrical post 502, and the mechanical arm 503. In the embodiment of FIG. 6, the mechanical arm 503 is a U-shaped arm that is coupled to the cylindrical post 502. Coupling techniques for mechanically attaching the mechanical arm 503 to the cylindrical post include adhesives, thermal bonding, press fitting, sonic welding, and other equivalent affixing means.

The centering device 600 is configured to align the first housing 101 with the second housing (102) relative to the actuation axis 106 (as seen in FIG. 1). In the embodiment of FIG. 6, this is accomplished with a plurality of springs 601,602 biasing the mechanical arm 503 about the cylindrical post 502 such that the first housing 101 is assisted into alignment with the second housing (102).

To limit the amount of motion that the first housing 101 may make about the actuation axis 106, a pair of mechanical stops 603,604 is disposed such that the first housing's motion is limited relative to the mechanical arm 503. While designers may configure these mechanical stops 603,604 to fit a particular application, in one embodiment they are disposed such that the first housing 101 may move less than 12 degrees relative to the mechanical arm 503 and the actuation axis 106.

Figure 7:
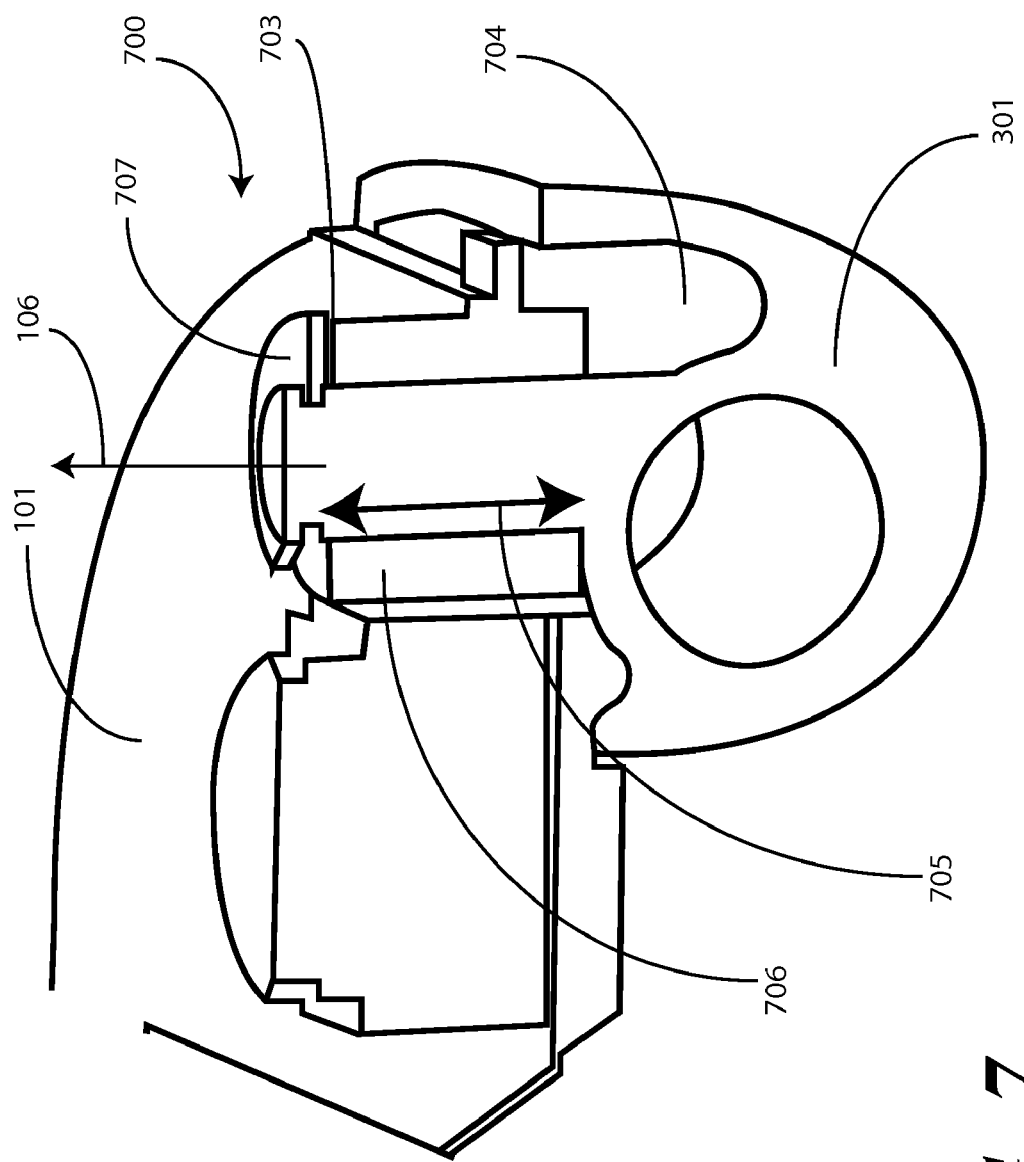
FIG. 7 illustrates a cut away view of a hinge configured for rotational actuation in accordance with one embodiment of the invention.

Turning now to FIG. 7, illustrated therein is one embodiment for an alternate multi-axis coupling mechanism 700. The embodiment of FIG. 7 employs many of the same elements as the embodiment of FIG. 5, including the first housing 101, the knuckle 301, and the cylindrical post 502. The differences between the embodiment of FIG. 7 and the embodiment of FIG. 5 include the configuration of the cylindrical post and the mode of coupling the first housing 101 to the cylindrical post 502.

In the embodiment of FIG. 7, the cylindrical post 502 is configured as a pin and bushing engagement 705, with a sleeve 706 of the first housing 101 serving as a bushing for the cylindrical post 502, which serves as the pin. The cylindrical post 502 is held securely within the bushing by a spring steel c-clip 707. As with the embodiment of FIG. 5, the cylindrical post 502 serves as a rotary member in that the first housing may rotate about the actuation axis 106 when coupled to the alternate multi-axis coupling mechanism 700.

One item of note in the cut away view of FIG. 7 is the void 704 disposed within the knuckle 301 behind the cylindrical post 502. This void 704 allows mechanical features extending from the first housing 101 to move when the first housing 101 rotates about the actuation axis 106. This void 704 may also be used to limit the motion of the first housing 101 about the actuation axis 106, as will be seen in the discussion of FIG. 8.

Figure 8:
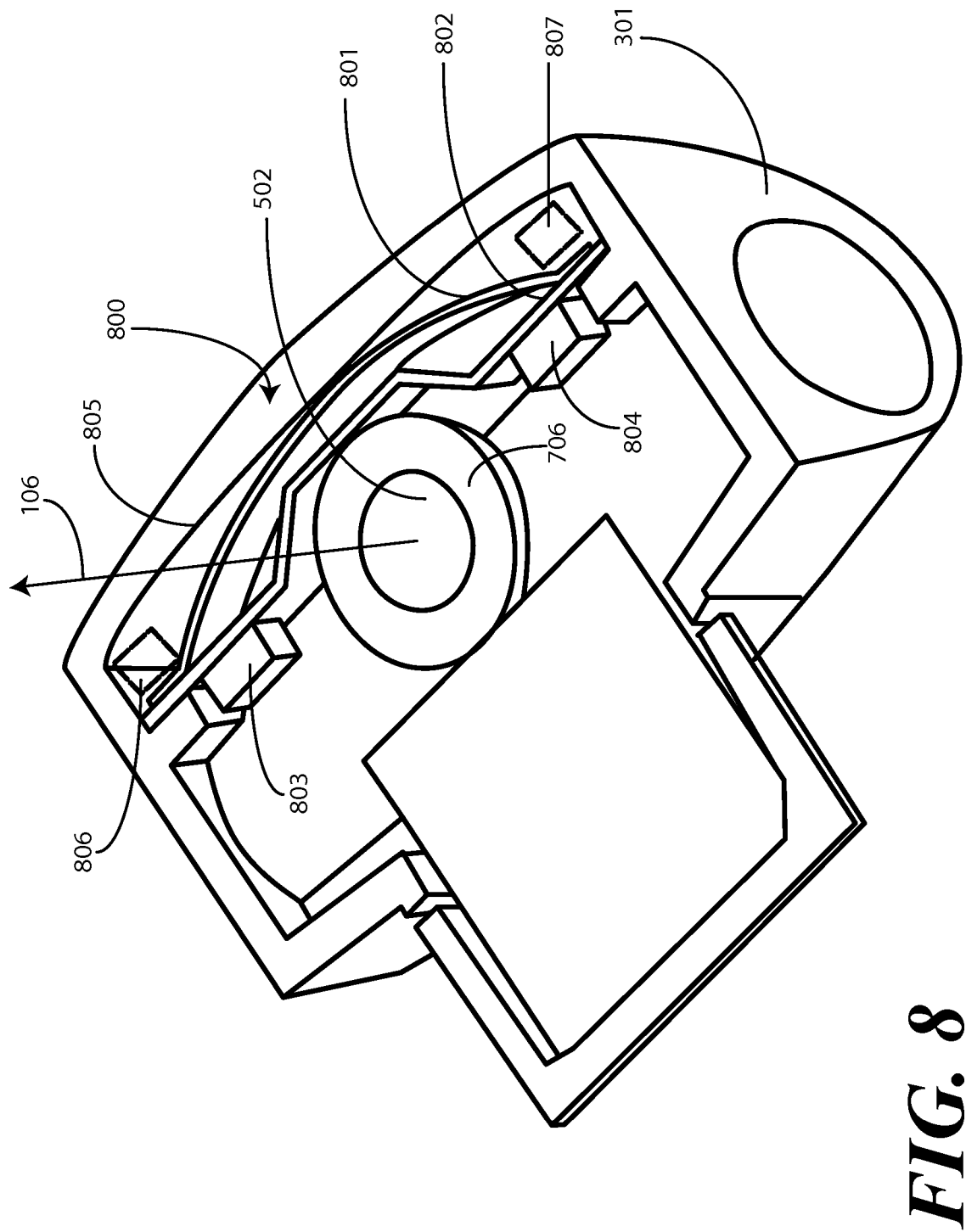
FIG. 8 illustrates an alternate centering device in accordance with one embodiment of the invention.

Turning now to FIG. 8, illustrated therein is an alternate centering device 800 that may be used both to help align the first housing (101) and limit the motion of the first housing (101) about the actuation axis 106. Several elements from FIG. 7 may be seen, including the cylindrical post 502 and the sleeve 706 (shown in cut away view), and the knuckle 301. In FIG. 8, the centering device 800 includes a preloaded leaf spring 801 biasing a floating plate 802 about the cylindrical post 502. The floating plate 802 is biased against two mechanical features 803,804 that project towards the knuckle 301 from the first housing (101). By centering the leaf spring 801 about the cylindrical post, force is applied to the mechanical features 803,804, thereby aligning the first housing (101) relative to the second housing (102) about the actuation axis 106.

Motion of the first housing is restricted by the rear wall 805 of the knuckle 301. When the leaf spring 801 and floating plate 802 contact the rear wall 805, motion is limited. In one embodiment, to delay the time of re-engagement of the retaining members, optional dampeners 806,807 are included. These dampeners, which may be grease-filled chambers, are configured to oppose the force applied by the centering device 800 to give the overall device (100) a more relaxed realignment about the actuation axis 106 after rotation.

Figure 9:
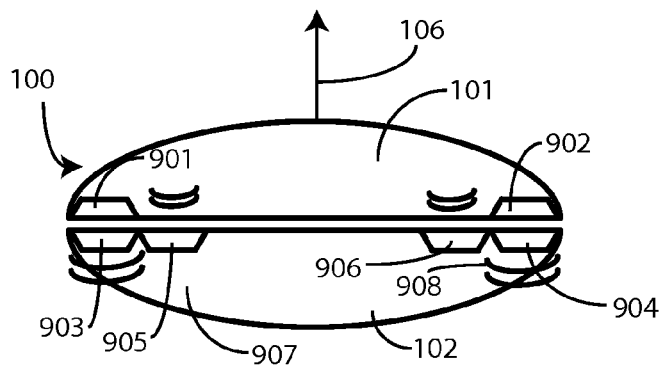
FIGS. 9-12 illustrate various retaining devices and assemblies in accordance with embodiments of the invention.

Turning now to FIGS. 9-12, illustrated therein are various retaining members and configurations suitable for use with embodiments of the invention. As noted above, in one embodiment, the retaining members comprise magnetic couplings. Turning first to FIG. 9, illustrated therein are the first housing 101 and second housing 102 in the closed position, with magnetic couplings serving as retaining members. Specifically, in this exemplary embodiment, the first housing 101 includes at least one magnet, i.e. two magnets 901,902 in the figure, disposed along the first housing. As the view of FIG. 9 is an end view, it can be seen that the magnets 901,902 are disposed at the distal end from the multi-axis coupling mechanism. Since the multi-axis coupling mechanism is biased, in one embodiment, to exert an opening force, disposing the magnets 901,902 at the distal end provides a leveraged force that counters the force applied by the multi-axis coupling mechanism (500). Note that the magnets 901,902 need not be disposed exactly at the end, but rather can be configured in a distal location from the multi-axis coupling mechanism (500) as the particular design application warrants.

To complete the retaining assembly, a component (or components) configured to be attracted to the magnets are disposed in the second housing. Here, complimentarily polarized magnets 903,904 have been provided in alignment with magnets 901,902 such that magnets 901,902 will be attracted to complimentarily polarized magnets 903,904 when the device 100 is in the closed position. It will be clear to those of ordinary skill in the art having the benefit of this disclosure that the invention is not so limited. Other materials, including ferrous metal materials, metallized plastics, and other hybrid materials configured to be attracted by magnetic forces could be substituted for the complimentarily polarized magnets 903,904. The magnetic field 907,908 of the magnetic couplings is strong enough to overcome the biasing force of the multi-axis opening device, thereby holding the first housing 101 and the second housing 102 in the closed position.

When the first housing 101 is rotated about the actuation axis 106, the magnetic coupling is broken, as magnets 901, 902 become misaligned with the complimentarily polarized magnets 903,904. In one embodiment, to provide a starter force to assist the multi-axis coupling mechanism (500), opposing members are provided. In the exemplary embodiment of FIG. 9, the opposing members comprise a second magnetic coupling configured to exert an opposing force.

Specifically, in the embodiment of FIG. 9, the opposing members comprise oppositely polarized magnets 905,906 that are configured to oppose one of the magnets 901,902 when the first housing 101 is rotated about the actuation axis 106. Where the first housing 101 is rotated left about the actuation axis 106, oppositely polarized magnet 905 aligns with magnet 901 to provide an oppositional force. Where the first housing 101 is rotated right about the actuation axis 106, oppositely polarized magnet 906 is aligned with magnet 902. In either scenario, the oppositely polarized magnet exerts an opposing force configured to cause the first housing 101 and second housing 102 to part.

Figure 10:
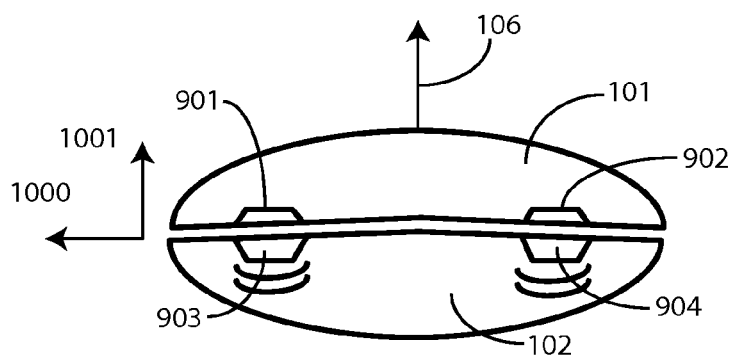
Figure 11:
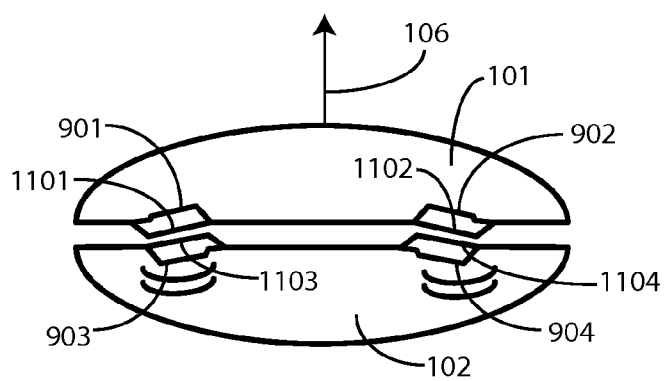
Figure 12:
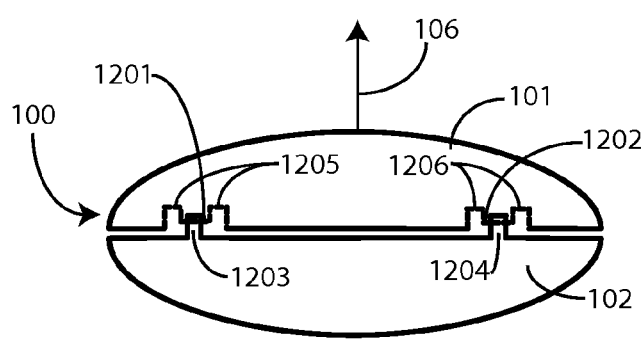

While oppositely polarized magnets are one means of providing an opposing force, it will be clear to those of ordinary skill in the art having the benefit of this disclosure that other means are available as well. FIGS. 10-12 illustrate a few exemplary means of providing such an oppositional force.

Turning first to FIG. 10, illustrated therein are the first housing 101 and second housing 102. Magnetic couplings formed by magnets 901,902 and complimentarily polarized magnets 903,904 hold the first housing and second housing in a closed position. In the embodiment of FIG. 10, the first housing mating surface 103 and the second housing mating surface 104 have been curved, with one being convex and the other being concave. When the first housing 101 is rotated about the actuation axis 106, the curvature of the first housing mating surface 103 and the second housing mating surface 104 causes magnets 901,902 to separate from complimentarily polarized magnets 903,904 not only in direction 1000, but also direction 1001. This additional separation, along the axis of direction 1001, further reduces any magnetic coupling, thereby assisting the multi-axis coupling mechanism (500) in opening the first housing 101 and second housing 102.

Turning now to FIG. 11, magnets 901,902, disposed on the first housing 101, have a first sloped portion 1202 that extends above the first face 114. The second housing has a second sloped portion 1204 adapted to engage the first sloped portion 1101,1102. Similarly, complimentarily polarized magnets 903,904 have sloped portions 1103,1104. As the first housing 101 rotates about the actuation axis 106, sloped portions 1101,1102 engage second sloped portions 1103,1104 to leverage the first housing 101 angularly from the second housing 102. This angular displacement further assists the multi-axis coupling mechanism (500).

Turning now to FIG. 12, illustrated therein is an alternate retaining device and release mechanism. In the exemplary embodiment of FIG. 12, the retaining members comprise hooks 1203,1204 and latches 1201,1202. When the first housing 101 is rotated about the actuation axis 106, the hooks 1203,1204 pass from the latches 1201,1202 to openings 1205, 1206, thereby releasing the first housing 101 from the second housing 102. The multi-axis coupling mechanism (500) is then allowed to operate. In the embodiment of FIG. 12, either the hooks 1203,1204 or the latches 1201,1202 may be spring loaded such that they may engage each other when the device 100 is closed.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A foldable device comprising a first housing and second housing joined by a biased hinge, operable about a hinge axis, having a pivot assembly coupling one of the first housing or the second housing to the biased hinge, wherein a tensioning device of the biased hinge is configured to cause the first housing and the second housing to rotate from a closed position to an angularly displaced open position about the hinge axis in response to a rotary motion of the one of the first housing or the second housing about a rotary axis of the pivot assembly while the first housing and the second housing are in the closed position assembly while the first housing and the second housing are in the closed position.

2. The foldable device of claim 1, wherein the tensioning device comprises a preloaded tensioning device.

3. The foldable device of claim 2, further comprising a retaining device configured to oppose the preloaded tensioning device so as to retain the first housing and the second housing in the closed position.

4. The foldable device of claim 3, wherein the retaining device is configured to disengage upon the rotary motion.

5. The foldable device of claim 3, where the retaining device comprises one of an attracting magnetic coupling or a latch and hook assembly.

6. The foldable device of claim 3, further comprising an opening device disposed proximately with the retaining device, such that upon the rotary motion the opening device biases the first housing towards the angularly displaced open position.

7. The foldable device of claim 6, wherein the opening device comprises one of a non-planar surface of at least one of a first housing mating surface or a second housing mating surface, or a magnetic coupling configured to oppose the first housing from the second housing.

8. The foldable device of claim 7, wherein the rotary motion comprises the first housing mating surface moving laterally across the second housing mating surface.

9. The foldable device of claim 1, further comprising a spring loaded centering device coupled to the one of the first housing or the second housing, the spring loaded centering device being configured to oppose the rotary motion.

10. A device comprising a first housing and a second housing coupled by a multi-axis opening mechanism comprising a tensioning device, the second housing being coupled to the multi-axis opening mechanism such that the tensioning device rotates the second housing from a closed position to an open position about an opening axis in response to a rotation of the first housing relative to the second housing about an actuation axis while the device is in a closed position, wherein the opening axis and actuation axis are substantially perpendicular.

11. The device of claim 10, wherein the multi-axis opening mechanism comprises a preloaded hinge operable about the opening axis and a rotary member operable about the actuation axis.

12. The device of claim 10, further comprising a centering device configured to align the first housing with the second housing relative to the actuation axis.

13. The device of claim 12, wherein the centering device comprises a mechanical arm, coupled to the first housing, and a plurality of springs, wherein the mechanical arm is disposed about a rotary member and is biased by at least two of the plurality of springs.

14. The device of claim 10, further comprising at least one mechanical stop configured to limit rotation of the first housing about the actuation axis.

15. The device of claim 14, wherein the at least one mechanical stop is configured to limit rotation of the first housing about the actuation axis to less than 12 degrees.

16. The device of claim 10, further comprising a coupling member engaging the first housing and the second housing in a closed position, wherein the coupling member comprises a magnetic coupling configured to exert an attracting force.

17. The device of claim 16, further comprising an opposing member configured to exert a force between the first housing and the second housing when the second housing rotates a predetermined amount about the actuation axis, wherein the opposing member comprises a second magnetic coupling configured to exert an opposing force.

18. A portable electronic device, comprising:
a first housing;
a second housing;
a multi-axis coupling mechanism coupled to one of the first housing or the second housing such that a tensioning device initiates rotation of the first housing angularly relative to the second housing about a first axis to open from a closed position to an angularly displaced open position in response to an other of the first housing or the second housing rotating, while in the closed position, about a second axis that is oriented substantially orthogonally relative to the first axis.

19. The portable electronic device of claim 18, wherein the one of the first housing or the second housing comprises at least one magnet disposed along the one of the first housing or the second housing at a distal end from the multi-axis coupling mechanism.

20. The portable electronic device of claim 19, wherein the other of the first housing or the second housing comprises at least one component configured to be attracted to the at least one magnet, the at least one component being disposed distally from the multi-axis coupling mechanism.

21. The portable electronic device of claim 20, wherein the another of the first housing or the second housing further comprises at least one repelling magnetic component configured to oppose the at least one magnet when aligned with the at least one magnet about the second axis.

22. The portable electronic device of claim 21, wherein the other of the first housing or the second housing further comprises a centering member configured to exert a force on the other of the first housing or the second housing so as to cause the at least one magnet to align with the at least one component.

* * * * *